United States Patent [19]
Admassu et al.

[11] Patent Number: 4,900,334
[45] Date of Patent: Feb. 13, 1990

[54] PROCESS FOR TREATING A LIQUID-WET POLYCARBONATE MEMBRANE TO IMPROVE ITS GAS SEPARATION PROPERTIES

[75] Inventors: Wudneh Admassu, Concord; John A. Jensvold; Daniel O. clark, both of Benicia, all of Calif.

[73] Assignee: The Dow Chemical Company, Midland, Mich.

[21] Appl. No.: 269,922

[22] Filed: Nov. 9, 1988

[51] Int. Cl.$^4$ .............................................. B01D 53/22
[52] U.S. Cl. ............................................. 55/16; 34/9; 55/158; 264/344
[58] Field of Search ............... 55/16, 158; 210/500.23, 210/500.4; 34/9; 264/344

[56] References Cited

U.S. PATENT DOCUMENTS

| 3,822,202 | 7/1974 | Hoehn | 55/158 X |
| 3,899,309 | 8/1975 | Hoehn et al. | 55/16 |
| 4,157,960 | 6/1979 | Chang et al. | 55/16 X |
| 4,527,999 | 7/1985 | Lee | 55/16 |
| 4,690,873 | 9/1987 | Makino et al. | 55/158 X |
| 4,764,320 | 8/1988 | Chau et al. | 210/500.4 X |
| 4,772,392 | 9/1988 | Sanders, Jr. et al. | 210/500.4 X |

FOREIGN PATENT DOCUMENTS 2510337 10/1975 Fed. Rep. of Germany ... 210/500.4

OTHER PUBLICATIONS

M. Moe et al., Effects of Film History on Gas Transport in a Fluorinated Aromatic Polyimide, J. of Applied Polymer Science, vol. 36, 1833–1846 (1988).

*Primary Examiner*—Robert Spitzer

[57] ABSTRACT

This invention relates to a method of treating liquid-wet polycarbonate membranes to improve gas separation properties.

15 Claims, No Drawings

PROCESS FOR TREATING A LIQUID-WET POLYCARBONATE MEMBRANE TO IMPROVE ITS GAS SEPARATION PROPERTIES

BACKGROUND OF THE INVENTION

This invention relates to a process for treating a liquid-wet polycarbonate membrane to improve its gas separation properties.

The use of polymeric membranes for gas separation is well known. A wide variety of polymers have been used for gas separation membranes, including cellulose esters, polyamides, polyimides, polysulfones, and polyolefins. An application of particular interest is membrane separation of oxygen and nitrogen from air. An enriched nitrogen stream obtained from air may be used for inert padding of flammable fluids or for food storage. An enriched oxygen stream obtained from air may be used for enhancing combustion or for increasing the efficiency of fermentation processes.

The membranes used for gas separations are preferably dry so that the most effective membrane separation performance can be achieved. However, many membranes are formed by the wet process, in which a solution of polymer, solvent(s) and optional non-solvent(s) is cast or extruded, the solvent(s) and optional non-solvents(s) optionally allowed to partially evaporate, followed by immersion in a coagulating liquid bath, often water, to gel and solidify the membrane while optionally extracting at least a portion of the solvent(s) and optional non-solvent(s). Thus, the membranes formed by the wet process are liquid-wet and preferably are dried prior to use for gas separation.

The art teaches that care must be taken during the drying process to maintain the physical structure of the membrane because structural changes such as pore collapse or crazing result in adverse membrane performance. The art discloses several techniques for drying a water-wet membrane fabricated from a cellulose ester so that the physical structure of the membrane is preserved. One such method is freeze drying. Another method involves sequentially contacting the membrane with polar and non-polar solvents. The purpose of the sequential solvent method is to sufficiently reduce the polymer-water interaction by replacing water with a non-polar solvent, thus lowering the surface tension, so that the membrane may be dried without an adverse impact on the structure of the membrane. The problem is that such techniques are expensive, time consuming, and generate large volumes of solvent for disposal. Furthermore, such techniques introduce sources of significant variation in membrane performance.

Polycarbonate membranes in particular have been discovered to possess good separation properties for gases, especially oxygen and nitrogen. Polycarbonate membranes formed by the wet process generally are porous or asymmetric, depending on the extrusion or casting conditions. Porous membranes may be used as supports for composite gas separation membranes. Composite membranes possess a thin, dense discriminating layer supported on a porous substructure of a different material. Asymmetric membranes possess a thin, dense discriminating layer supported on a porous substructure of the same material. The discriminating layer provides the membrane with gas separating capability. The membrane discriminating layer is preferably as thin as possible while still maintaining the ability to separate gases in order that the highest possible gas flux through the membrane may be achieved. POWADIR membranes may also be fabricated by the wet process. POWADIR membranes possess one or more discriminating regions capable of separating gases and one or more porous regions. An asymmetric membrane is a POWADIR membrane, but a POWADIR membrane is not necessarily asymmetric.

Polycarbonate membranes formed by the wet process may be directly dried in air. However, such polycarbonate membranes generally contain small amounts of residual solvent and non-solvent even after leaching which adversely affect the performance of the dried membranes. The presence of even small amounts of residual solvent and non-solvent in the dried membrane can result in reduced gas flux, reduced separation factor (selectivity), increased membrane performance variability, and increased compaction rate. An inexpensive, timely, and reproducible method of drying polycarbonate membranes which enhances separation properties through the removal of residual solvent and non-solvent prior to drying is needed. Such a method preferably does not employ toxic solvents which present problems with respect to disposal and exposure of personnel during the membrane fabrication process.

Furthermore, polycarbonate membranes formed by the wet process may possess a lower than optimal gas selectivity because of microscopic deficiencies in the membrane's morphological structure. For example, the discriminating layer may contain microscopic defects interrupting the continuity of the discriminating layer, resulting in a less than optimal gas selectivity, or the discriminating layer may not be "dense" enough, that is, the pores in the discriminating layer may not be sufficiently small so that the discriminating layer is capable of efficiently separating gases. Therefore, a process is also needed which results in increased gas selectivity through a modification of the membrane's morphological structure by "tightening" the discriminating layer with out producing a significant decrease in the gas flux through the membrane. Such a treatment process also preferably imparts to the membrane long term operating stability at high temperatures and pressures. That is, the membranes so treated preferably do not exhibit a significant compaction rate over time. Compaction rate consists of a significant loss of separation properties measured as a decrease in gas flux over time under given conditions of operating temperature and pressure.

A single process which results in a dry polycarbonate membrane with improved membrane separation properties through both removal of residual solvent and non-solvent and a modification of the membrane's morphological structure to substantially eliminate compaction during subsequent operation would be particularly advantageous.

SUMMARY OF THE INVENTION

What has now been discovered is a process for treating a liquid-wet polycarbonate membrane comprising the steps of:

A. optionally storing the membrane in water under ambient conditions of temperature and pressure for a period of time sufficient to provide uniform membrane composition;

B. contacting at least one side of the membrane with water at a temperature under conditions such that the water removes substantially all of the residual solvent and non-solvent from the membrane;

C. contacting at least one side of the membrane with air, an inert gas, or a vacuum at a temperature under conditions such that substantially all of the water is removed from the membrane without deleteriously affecting the integrity of the membrane; and D. simultaneously or consecutively heat treating the membrane under conditions such that the membrane subsequently exhibits a decrease in gas flux of less than about 2 percent over 30 days under an operating temperature of less than about 25° C. and an operating pressure of less than about 200 psig.

The inventive process produces a dry polycarbonate membrane with increased flux and separation factor compared with a polycarbonate membrane which is directly air dried at ambient temperature without any additional treatment prior to drying. Membranes treated by the inventive process also possess substantially greater uniformity in performance than membranes not similarly treated. Furthermore, a membrane treated by the inventive process does not exhibit significant compaction under subsequent operation.

DETAILED DESCRIPTION OF THE INVENTION

This invention relates to a process for treating liquid-wet polycarbonate membranes. Liquid-wet refers to membranes containing a substantial amount of liquid. For example, following manufacture, liquid-wet polycarbonate membranes generally contain greater than about 30 weight percent liquid. The liquid-wet membranes may contain up to as much as about 70 weight percent liquid. The inventive process preferably reduces the concentration of liquid present in the membrane to below about 1.0 weight percent, more preferably to below about 0.3 weight percent. In the case of water-wet polycarbonate membranes, most preferably, the process reduces the concentration of water present in the membrane to the concentration of water present in the ambient air.

The inventive process may be used for polycarbonate membranes, particularly for membranes in which the polycarbonates are derived from bisphenols. The process is preferably used on polycarbonate membranes wherein a significant portion of the bisphenols used to prepare the polycarbonates possess substituents on the phenolic rings. Preferably at least about 25 percent of the bisphenols in the polymer backbone possess substituents on the phenolic rings. Preferably the bisphenols used to prepare the polycarbonates are tetrasubstituted. The substituents are preferably located at the 3,5 positions on the phenolic rings.

The polycarbonates useful in this invention preferably comprise polymers with backbone units corresponding to Formula 1:

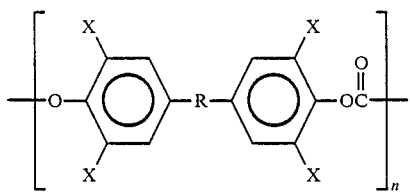

Formula 1 wherein
R is independently in each occurrence —CO—, —S—, —SO$_2$—, —O—, a C$_{1-6}$ divalent hydrocarbon radical, an inertly substituted C$_{1-6}$ divalent hydrocarbon radical, or a C$_{1-6}$ divalent halocarbon radical;

X is independently in each occurrence hydrogen, chlorine, bromine, fluorine, a C$_{1-4}$ alkyl, or a C$_{1-4}$ haloalkyl; and n is a positive real number of about 20 or greater.

R is preferably a C$_{1-6}$ divalent hydrocarbon, more preferably a C$_{1-6}$ alkylidene radical, most preferably an isopropylidene radical. X is preferably hydrogen, chlorine, bromine, fluorine, or methyl. n is preferably a positive real number of about 35 or greater. An especially preferred bisphenol of Formula 1 useful in this invention is 2,2-bis(3,5-bromo-4-hydroxyphenyl)-propane(tetrabromobisphenol A polycarbonate).

Methods of synthesizing such polycarbonates are well known in the art. See U.S. Pat. Nos. 3,038,874; 3,119,787; 3,153,008; 3,248,366; 3,334,154; 3,409,704; 3,829,266; 3,912,687; and 4,413,103, the relevant portions incorporated herein by reference. See also *Encyclopedia of Polymer Science*, Interscience Division of John Wiley and Sons, N.Y., N.Y., 1969, Vol. 10, pp. 714–725, the relevant portions incorporated herein by reference.

The liquid-wet polycarbonate membranes which may be treated by the inventive process may be manufactured by methods known in the art. Such membranes may be fabricated in the form of flat sheets, hollow tubes, or hollow fibers. One preferred method of producing such membranes is to extrude a polymer blend of the polymer, a solvent, and a non-solvent. An example of a preferred solvent is N-methylpyrrolidone. An example of a preferred non-solvent is triethylene glycol. The polymer blend preferably contains from about 30 to about 60 weight percent polymer. The preferred solvent/non-solvent ratio is between about 1.7 and about 5.1. The polymer blend is extruded, immersed in a water quench bath, then optionally leached and annealed in water. A further description of the preferred extrusion process, including preferred solvents and non-solvents, is contained in co-pending U.S. patent application Ser. No. 118,119, filed Nov. 6, 1987, U.S. Pat. No. 4,772,392, incorporated herein by reference.

Following manufacture, the polycarbonate membranes usually contain residual solvent and non-solvent. For example, polycarbonate membranes formed by the process described in co-pending U.S. patent application Ser. No. 118,119, filed Nov. 6, 1987, U.S. Pat. No. 4,772,392, generally contain from about 0.5 to about 3.0 weight percent residual solvent and non-solvent as extruded. The presence of residual solvent and non-solvent in the membranes adversely affects membrane performance. Therefore, the residual solvent and non-solvent are preferably removed prior to drying.

The membranes may optionally be stored in water at ambient or elevated temperature and pressure for a period of time sufficient to provide a uniform membrane composition. The membranes are preferably stored in water at ambient temperature and pressure for at least 2 hours, more preferably for at least 24 hours, even more preferably for at least 5 days, most preferably for at least 10 days. The amount of water used to store the membranes is that which is sufficient to avoid a significant build up of solvent and non-solvent in the storage water at ambient temperature and pressure for the time period of storage. The amount of solvent and non-solvent in the storage water is preferably kept below about 0.2 weight percent, more preferably below about 0.05 weight percent. The amount of water used to store the membranes is preferably at least about 0.2 liters/square meter of membrane surface area, more preferably at least about 0.6 liters/square meter of membrane surface area. The storage water may optionally contain bleach (HOCl) in order to prevent bacterial growth on the membranes during storage. Generally low concentrations of bleach, such as 100 ppm of 5 weight percent HOCl, are sufficient to prevent bacterial growth on the membranes during storage and do not adversely affect membrane separation properties. Alternately, the pH of the water may be maintained below 5 to prevent bacterial growth on the membranes during storage.

Following the optional storage in water at ambient temperature and pressure, at least one side of the polycarbonate membranes is contacted with water at a temperature under conditions such that substantially all of the residual solvent and non-solvent is removed from the membrane by the water. The minimum temperature of the water is such that removal of the solvent and non-solvent occurs at reasonable rates. The temperature of the water is preferably at least about 0° C., more preferably at least about 20° C. The maximum temperature of the water is such that membrane integrity is not adversely affected. The maximum temperature of the water is preferably less than about 100° C., more preferably less than about 90° C. The membrane is contacted with water for a time sufficient to remove substantially all of the residual solvent and non-solvent. The membrane is contacted with water for at least about 0.1 hours, more preferably for at least about 1.0 hours, even more preferably for about 4.0 hours. The amount of water used to contact the membranes is that which is sufficient to avoid a significant build up of solvent and non-solvent in the water. The amount of solvent and non-solvent present in the water is preferably less than about 0.2 weight percent, more preferably less than about 0.05 weight percent. The amount of water used to contact the membranes is preferably at least about 0.2 liters/square meter of membrane surface area, more preferably at least about 0.6 liters/square meter of membrane surface area. Following contacting with water, the polycarbonate membranes preferably contain less than about 1.0 weight percent solvent and non-solvent, more preferably less than about 0.5 weight percent solvent and non-solvent, most preferably less than about 0.1 weight percent solvent and non-solvent. The amounts of residual solvent and non-solvent in the polycarbonate membranes are readily determined by conventional gas chromatography using a flame ionization detector with internal or external standard.

The contacting of the membranes with water may take place as a batch or continuous process. For example, the membranes may be immersed in the water. Alternately, the membranes may be flushed with the water. In the case of hollow fiber membranes, the water may be passed over the outside of the hollow fibers and/or passed down the bores of the hollow fibers. A continuous flushing process will use less water than a batch process since in a batch process the stagnant boundary layer may contain high levels of solvent and non-solvent which impede extraction of the residual solvent and non-solvent from the membranes.

Following the contacting with water, the membranes are dried. The membranes are dried by contacting at least one side of the membrane with air or an inert gas such as helium, nitrogen, or argon, or under vacuum under conditions which substantially remove all of the residual water in the membranes. The gas used to dry the membranes should be sufficiently free of water so as to enable the removal of water from the membranes. The membranes may be dried by exposing the membranes to the drying gas or by blowing the drying gas past the surface of the membranes. In the case of hollow fiber membranes, the drying gas may be passed over the outside of the hollow fibers and/or passed down the bores of the hollow fibers. Preferably drying takes place by blowing the drying gas past the surface of the membranes because such a process avoids a build up of the water concentration in the boundary layer of the drying gas next to the membrane surface which impedes drying.

Drying of the membrane may also take place as a membrane module is being fabricated. In the case of hollow fiber membrane modules, this may be accomplished by passing the drying gas down the core of the module to radially distribute the drying gas through the membrane bundle, or by otherwise introducing drying gas to the shellside or tubeside of the module.

The maximum drying temperature is below that temperature at which membrane integrity is adversely affected. The membranes are preferably dried at a temperature less than about 90° C., more preferably less than about 70° C., even more preferably less than about 50° C. The minimum drying temperature is the lowest temperature at which drying, that is, evaporation of the water, takes place at a reasonable rate. The minimum drying temperature is preferably greater than about 5° C., more preferably greater than about 15° C. Drying at ambient temperatures is often convenient.

Drying may take place by exposing the membrane to the drying gas. Drying preferably occurs by blowing the drying gas past the surface. In such an embodiment, the minimum flowrate of gas used to dry the membrane should be such that the concentrations of water in the drying gas do not reach a level high enough to significantly impede drying of the membranes. The flowrate of gas used to dry the membranes is preferably at least about 0.3048 standard cubic meters per square meter per hour, more preferably at least about 0.9144 standard cubic meters per square meter per hour. The maximum flowrate of the drying gas is that flowrate which is practically achieved. In the embodiment wherein the membrane is dried by blowing the drying gas down the bores of hollow fiber membranes, the pressure drop along the length of the membranes will dictate the practical limit on the flowrate of the drying gas.

The drying time is that which is sufficient to remove substantially all of the water from the membranes. The drying time is preferably between about 0.1 to about 10 hours, more preferably between about 2 to about 6 hours, at a temperature of about 25° C.

The membranes are then heat treated. The heat treatment of the membranes may occur simultaneously with or consecutive to the drying of the membranes. The membranes are heat treated under conditions such that the membranes subsequently exhibit a compaction rate measured by a decrease in flux over 30 days under an operating temperature of less than about 25° C. and an operating pressure of less than about 200 psig of less than about 2.0 percent, more preferably of less than about 1.0 percent. The minimum heat treatment temperature is that temperature at which no substantial flux loss is observed over a reasonable treatment time. The membranes are preferably heat treated at a minimum heat treatment temperature of at least about 20° C., more preferably at about 40° C., even more preferably at least about 60° C. The maximum heat treatment temperature is that temperature at which membrane integrity is adversely affected. The maximum heat treatment temperature is preferably less than about 150° C., more preferably less than about 120° C. The heat treatment time is that time which is sufficient to stabilize the flux under subsequent operating conditions. The minimum heat treatment time is preferably greater than about 10 seconds, more preferably greater than about 1 hour. The maximum heat treatment time is less than about 1 month, more preferably less than about 1 week, even more preferably less than about 48 hours.

The membranes treated by the inventive process are used to isolate or recover gases from gaseous mixtures. When mounted in a gas separation device so as to provide two regions separated by the membrane, one side of the membrane is contacted with a feed gas mixture under pressure, while a pressure differential is maintained across the membrane. At least one of the components in any given gas mixture selectively permeates through the membrane more rapidly than the other components. A stream is obtained on the low pressure side of the membrane which is enriched in at least one faster permeating component. The permeated gas is removed from the low pressure (downstream side) of the membrane. A stream depleted in at least one faster permeating component is withdrawn from the high pressure (upstream) side of the membrane. The membranes are of particular use in the separation of oxygen and nitrogen from air. In such embodiments, oxygen selectively permeates through the membrane more rapidly than nitrogen.

Gas permeability is defined as $$P = \frac{\text{(amount of permeant) (membrane thickness)}}{\text{(area) (time) (driving force gradient across the membrane)}}.$$

A standard permeability unit is the Barrer, which is equal to $$\frac{(\text{centimeter})^3 \text{ (STP) (centimeter)}}{(\text{centimeter})^2 \text{ (second) (centimeter Hg)}} \times 10^{-10},$$

where STP stands for standard temperature and pressure, abbreviated hereinafter as $$\frac{cm^3 \text{ (STP) cm}}{cm^2 \text{ s cm Hg}} \times 10^{-10}.$$

The gas flux is defined as (permeability)÷(membrane thickness). A standard gas flux unit is $$10^{-6} \frac{(\text{centimeter})^3 \text{ (STP)}}{(\text{centimeter})^2 \text{ (second) (centimeter Hg)}}$$

abbreviated hereinafter as $$10^{-6} \frac{cm^3 \text{ (STP)}}{cm^2 \text{ s cm Hg}}.$$

The gas separation factor (gas selectivity) is the ratio of the permeability or gas flux of the faster permeating gas to the permeability or gas flux of the slower permeating gas.

In the embodiment where oxygen is separated from nitrogen, the polycarbonate membranes treated by this inventive process preferably have a separation factor for oxygen/nitrogen of at least about 4, more preferably at least about 6. The permeability of oxygen at about 25° C. is preferably at least about 1.0 Barrers, more preferably at least about 1.2 Barrers. The flux of oxygen at about 25° C. is preferably at least about $$3.0 \times 10^{-6} \frac{cm^3 \text{ (STP)}}{cm^2 \text{ s cm Hg}}.$$

more preferably at least about $$6.0 \times 10^{-6} \frac{cm^3 \text{ (STP)}}{cm^2 \text{ s cm Hg}}.$$

SPECIFIC EMBODIMENTS

Example 1

Effect Of Water Flushing Temperature On Residual Solvent and Non-solvent Levels In Tetrabromobisphenol A Polycarbonate Membranes Hollow fibers are extruded from about a 50 to 52 weight percent 2,2-bis(3,5-bromo-4-hydroxyphenol)-propane (tetrabromobisphenol A polycarbonate) extrusion blend. The extrusion contains N-methylpyrrolidone as the solvent and triethylene glycol as the non-solvent in about a 2.1 to 2.3 solvent/non-solvent ratio. The extrusion blend is extruded at about 55°–60° C., quenched in a water bath at less than about 5° C. for about 1 to 3 seconds, and leached and annealed in water at about 80° to 90° C. for about 5 to 6 minutes.

Samples on spools are flushed with water at about 23° C. and about 50° C. respectively for about 3 hours. All samples are then dried by exposing the fibers to ambient air for about 4 hours. Residual solvent and non-solvent levels are measured by gas chromatography using a flame ionization detector with an internal or external standard. A fused silica capillary column obtained from J. N. W. Scientific, Inc. under the product designation DB5 is used. The injection sample is prepared by dissolving a portion of the membrane in methylene chloride. The polymer in the resulting solution is optionally precipitated from the solution with alcohol prior to injecting the sample into the gas chromatograph in order to prevent fouling of the column.

Data on residual solvent and non-solvent levels are shown in Table I. Flushing the fibers with water, particularly water at elevated temperature, significantly reduces the residual solvent and non-solvent levels in the fibers.

TABLE I

EFFECT OF WATER FLUSHING TEMPERATURE ON RESIDUAL SOLVENT AND NON-SOLVENT LEVELS

| Sample | Flushing Temperature (°C.) | Residual Solvent and Non-solvent (weight percent) |
|---|---|---|
| Control | — | 1.73 |
| Flushed | 23 | 1.26 |
| Control | — | 2.02 |
| Flushed | 50 | .059 |

Example 2

Effect Of Water Flushing Temperature on Gas Separation Properties Of Tetrabromobisphenol A Polycarbonate Membranes Hollow fibers are extruded, quenched, and leached and annealed as described in Example 1. Hollow fibers are stored on spools in water at ambient temperature for at least 24 hours to serve as control samples. Additional samples on spools are flushed with water at about 40°, 45°, and 50° C. respectively for 3 hours. All samples are then dried by exposing the fibers to ambient air for about 2–4 hours.

Test units are assembled, the fluxes of oxygen and nitrogen measured, and the separation factors calculated. The test device is a pressure vessel with four ports, two tubesheet ports, one feed port through which the compressed gas enters the vessel, and an exit or purge port through which the compressed gas can be purged from the vessel. Three hundred (300) fibers are passed into one of the tubesheet ports and out the other, allowing for about a 31.5 cm length of the fibers to be contained within the test device. Epoxy tubesheets are formed in the two tubesheet ports to give a leak-tight bond between the fiber and the two ports. Test units are then pressurized with nitrogen at about 50 psig by allowing compressed nitrogen to enter the test device through the feed port while leaving the exit port closed. The exit port is then opened for at least two minutes to purge the vessel of air and then closed with pure nitrogen left in the vessel. With the exit port closed and the feed port opened, the gas contained within the test device, by means of a pressure driving force, permeates through the walls of the hollow fibers and passes through the lumen of the fibers and out through the tubesheet ports where the flowrate is measured either by means of bubble or mass flow meters. There is negligible back pressure on the gas exiting the tubesheet. After testing with nitrogen, the feed gas is changed to oxygen and the vessel is purged for at least two minutes to give pure oxygen at 50 psig in the test device. The amount of oxygen permeating through the fiber walls is measured by combining the outputs from the two tubesheet ports. From these flow measurements, the gas permeation rates and separation factor can be calculated by use of the following equations.

$$\text{Nitrogen flux} = \frac{\text{Measured flow (cm}^3\text{/min) (STP)}}{\text{surface area of fiber (cm}^2\text{)} \times \text{pressure (cm Hg)} \times 60 \text{ (seconds/minute)}}$$

$$\text{Oxygen flux} = \frac{\text{Measured flow (cm}^3\text{) (STP)}}{\text{surface area of fiber (cm}^2\text{)} \times \text{pressure (cm Hg)} \times 60 \text{ (seconds/minute)}}$$

The units are $\text{cm}^3(\text{STP})/(\text{cm}^2 \text{ sec cm Hg})$.

Measured flow = standard cubic centimeters/minute.

Surface area of fibers = $3.14 \times$ OD (outside diameter, cm) $\times$ length $\times$ the number of fibers.

Pressure (cm Hg) = psi $\times$ 76/14.7.

$$\text{Separation Factor} = \frac{\text{Oxygen Flux}}{\text{Nitrogen Flux}}$$

Data are tabulated in Table II. Flushing the membranes with hot water reduces the level of residual solvent and non-solvent in the membranes and significantly improves the gas flux of the membranes with only a minimal decrease in separation factor.

TABLE II

EFFECT OF WATER FLUSHING TEMPERATURE ON GAS SEPARATION PROPERTIES

| Sample | Flushing Temperature (°C.) | Oxygen/Nitrogen Separation Factor | Oxygen Flux $10^{-6} \frac{\text{cm}^3 \text{ (STP)}}{\text{cm}^2 \text{ sec cm Hg}}$ | Residual Solvent and Non-solvent (weight percent) |
|---|---|---|---|---|
| Control | — | 6.04 | 16.20 | 0.89 |
| Flushed | 40 | 5.90 | 20.34 | 0.34 |
| Control | — | 5.83 | 7.19 | 1.44 |
| Flushed[2] | 45 | 5.72 | 12.44 | 0.74 |
| Control | — | 6.99 | 4.89 | 1.49 |
| Flushed[3] | 50 | 6.85 | 17.67 | 73 |

[1]Sample stored in water 6 days before flushing.
[2]Sample stored in water 24 hours before flushing.
[3]Sample stored in water 48 hours before flushing.

Example 3

Effect Of Hot Water Flushing and Heat Treatment On Gas Separation Properties of Tetrabromobisphenol A Polycarbonate Membranes Hollow fibers are extruded, quenched, and leached and annealed as described in Example 1. Fiber samples are stored in water for at least 24 hours to 5 days before drying at ambient temperature for 2–4 hours to serve as controls. Additional fibers are stored in water for at least 5 days, then flushed with water at about 50° C. for about 3 hours, dried in air at ambient temperature for about 4 hours, and heat treated in an oven at about 60° C. for about 24 hours. Test units are assembled, the fluxes of oxygen and nitrogen measured, and the separation factors calculated.

Data are tabulated in Table III. The treated membranes possess higher gas fluxes and separation factors compared to the untreated membranes.

TABLE III

EFFECT OF HOT WATER FLUSHING AND HEAT TREATMENT ON GAS SEPARATION PROPERTIES

| Sample | Oxygen Flux $10^{-6} \frac{\text{cm}^3 \text{ (STP)}}{\text{cm}^2 \text{ sec cm Hg}}$ | Oxygen/Nitrogen Separation Factor |
|---|---|---|
| 1 Control | 8.10 | 6.75 |
| Treated | 9.80 | 7.49 |
| 2 Control | 7.39 | 6.85 |
| Treated | 9.71 | 7.24 |
| 3 Control | 6.17 | 7.29 |
| Treated | 9.86 | 7.42 |

Example 4

Effect Of Simultaneous Drying And Heat Treatment On Gas Separation Properties Of Hot Water Flushed Tetrabromobisphenol A Polycarbonate Membranes Hollow fibers are extruded, quenched, and leached and annealed as described in Example 1. The fibers are flushed with water at a temperature of about 50° C. for 3 hours. A control sample of wet fibers is dried at ambient temperature for about 4 hours, then subjected to heat treatment in an oven at about 60° C. for about 24 hours. A second sample of wet fibers is directly heat treated at about 60° C., without prior drying, for about 24 hours. Test units are fabricated, the fluxes of oxygen and nitrogen measured, and separation factors calculated.

Data are shown in Table IV. The data indicate that wet fibers may be simultaneously dried and heat treated, while retaining equivalent gas separation performance, without going through a separate drying step.

TABLE IV
EFFECT OF SIMULTANEOUS DRYING AND HEAT TREATMENT ON GAS SEPARATION PROPERTIES

| Sample | Nitrogen Flux $10^{-6} \frac{cm^3 (STP)}{cm^2\ sec\ cm\ Hg}$ | Oxygen Flux $10^{-6} \frac{cm^3 (STP)}{cm^2\ sec\ cm\ Hg}$ | Oxygen/Nitrogen Separation Factor |
|---|---|---|---|
| Air Dry + Heat Treat | 1.406 | 10.18 | 7.2 |
| Heat Treat only | 1.406 | 10.40 | 7.4 |

Example 5

Reduction Of Gas Separation Property Performance Variation by Hot Water Flushing and Heat Treatment Of Tetrabromobisphenol A Polycarbonate Membranes Hollow fibers are prepared as described in Example 1. Some samples are flushed with about 50° C. water for about 3 hours, dried in ambient air for about 4 hours, then heat treated for about 24 hours at about 60° C. Other samples are not flushed with the hot water but are similarly dried and heat treated. Test units are fabricated to measure membrane performance.

Data are given in Table V.

TABLE V

| | Unflushed | | Flushed | |
|---|---|---|---|---|
| Sample | $O_2/N_2$ Separation Factor | Oxygen Flux $10^{-6} \frac{cm^3 (STP)}{cm^2\ sec\ cm\ Hg}$ | $O_2/N_2$ Separation Factor | Oxygen Flux $10^{-6} \frac{cm^3 (STP)}{cm^2\ sec\ cm\ Hg}$ |
| 1 | 6.85 | 11.61 | 7.12 | 10.60 |
| 2 | 6.84 | 11.43 | 7.12 | 10.60 |
| 3 | 6.70 | 11.50 | 7.01 | 11.20 |
| 4 | 6.40 | 11.65 | 7.00 | 11.30 |
| 5 | 6.38 | 9.75 | 7.04 | 9.68 |
| 6 | 7.12 | 9.04 | 7.33 | 10.08 |
| 7 | 6.14 | 9.43 | 7.18 | 10.24 |
| 8 | 6.64 | 8.43 | 7.08 | 10.40 |
| 9 | 6.80 | 7.31 | 7.08 | 9.90 |
| | 6.64 ± .30 | 10.02 ± 1.16 | 7.11 ± .10 | 10.44 ± .55 |

Hot water flushing significantly reduces the gas separation performance variation between different fiber samples.

Example 6

Effect Of Heat Treating Temperature On Gas Separation Properties Of Tetrabromobisphenol A Polycarbonate Membranes Hollow fibers are prepared as described in Example 1. The fibers are soaked in room temperature water for about 10 days. The fibers are then flushed with about 50° C. water for about 3 hours and dried with ambient air for about 4 hours. The fibers are then subjected to different heat treatment temperatures and times. Tests units are fabricated to measure gas separation performance.

Data are reported in Table VI.

TABLE VI

| Sample | Heat Treatment Temp. (°C.) | Heat Treatment Time (Hrs.) | $O_2/N_2$ Separation Factor | Oxygen Flux $10^{-6} \frac{cm^3 (STP)}{cm^2\ sec\ cm\ Hg}$ |
|---|---|---|---|---|
| 1 | 60 | 24 | 7.2 | 12.42 |
| 2 | 70 | 4 | 7.1 | 11.63 |
| 3 | 85 | 3 | 7.3 | 9.84 |

The maximum oxygen flux occurs at a heat treatment temperature of about 60° C. and about 24 hours treatment time.

Example 7

Effect Of Heat Treating Tetrabromobisphenol A Polycarbonate Membranes On Compaction Rate Hollow fibers are extruded, quenched, leached, and annealed as described in Example 1. The fibers are stored in room temperature water for at least 5 days. The fibers are then flushed with water at about 50° C. for about 3 hours. The fibers are then dried and heat treated in an oven at about 60° C. for about 24 hours. Test units are assembled, the inital fluxes of oxygen and nitrogen are measured, and then the test units are subjected to a combination of different temperatures and pressures for 30 days.

Data are tabulated in Table VII.

TABLE VII

| Sample | Pressure (psi) | Temp. (°C.) | Initial Oxygen Flux at 25° C. $10^{-6} \dfrac{cm^3 \text{ (STP)}}{cm^2 \text{ sec cm Hg}}$ | Initial $O_2/N_2$ Separation Factor | Percent Decrease in Flux Over 30 days (Compaction Rate) |
|---|---|---|---|---|---|
| 1 | 135 | 25 | 9.96 | 7.18 | 1.5–2.5 |
| 2 | 135 | 40 | 10.31 | 7.40 | 10–13 |
| 3 | 50 | 25 | 10.10 | 7.05 | 0.5–1.5 |
| 4 | 50 | 40 | 9.85 | 7.13 | 10–13 |
| 5 | 0 | 25 | 10.20 | 7.15 | 1.0 |
| 6 | 0 | 40 | 9.91 | 7.35 | 6–8 |

The compaction rate increases with increasing temperature but remains fairly constant with increasing pressure.

Example 8

Effect Of Storage Time In Water At Ambient Conditions On Gas Separation Properties Of Tetrabromobisphenol A Polycarbonate Membranes Hollow fibers are extruded, quenched, leached, and annealed as described in Example 1. The fibers are stored in room temperature water for about 2 hours, 120 hours, and 240 hours respectively. The fibers are flushed with about 50° C. water for about 3 hours and dried at ambient temperature for about 4 hours. The fibers are then heat treated at about 60° C. for about 24 hours.

Test units are fabricated and the gas separation performance of the membranes determined. Data are tabulated in Table VIII.

TABLE VIII

| Sample | Storage Time (hr.) | $O_2/N_2$ Separation Factor | Oxygen Flux $10^{-6} \dfrac{cm^3 \text{ (STP)}}{cm^2 \text{ sec cm Hg}}$ |
|---|---|---|---|
| 1 | 2 | 7.2 | 7.95 |
| 2 | 120 | 7.3 | 10.54 |
| 3 | 240 | 7.1 | 12.42 |

The oxygen flux increases with increased storage time in water while the separation factor remains constant.

What is claimed is:

1. A process for treating a liquid-wet polycarbonate membrane comprising the steps of:
   A. contacting at least one side of a polycarbonate membrane with water at a temperature which does not deleteriously affect the integrity of the membrane under conditions such the water removes substantially all of the residual solvent and non-solvent from the membrane;
   B. contacting at least one side of the membrane with air, an inert gas, or vacuum at a temperature under conditions such that substantially all of the water is removed from the membrane without deleteriously affecting the integrity of the membrane; and
   C. simultaneously or consecutively heat treating the membrane under conditions such that the membrane subsequently exhibits a decrease in gas flux of less than about 2 percent over 30 days under an operating temperature of less than about 25° C. and an operating pressure of less than about 200 psig with an increase in gas selectivity of at least about 5 percent compared with a membrane which is not heat treated.

2. The process of claim 1 which further comprises the additional step of first storing the membrane in water under ambient conditions of temperature and pressure for a period of time sufficient to provide uniform membrane composition.

3. The process of claim 2 wherein the polycarbonate membrane is fabricated from polymers comprised of backbone units corresponding to the formula:

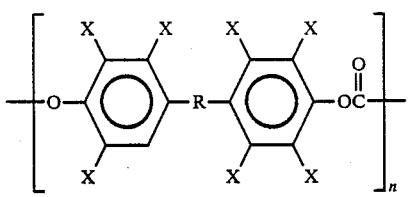

Formula 1 wherein
R is independently in each occurrence —CO—, —S—, —SO$_2$—, —O—, a $C_{1-6}$ divalent hydrocarbon radical, an inertly substituted $C_{1-6}$ divalent hydrocarbon radical, or a $C_{1-6}$ divalent halocarbon radical;
X is independently in each occurrence hydrogen, chlorine, bromine, fluorine, a $C_{1-4}$ alkyl, or a $C_{1-4}$ haloalkyl; and
n is a positive real number of about 20 or greater.

4. The process of claim 3 wherein
R is a $C_{1-6}$ divalent hydrocarbon radical; and
X is hydrogen, chlorine, bromine, fluorine, or methyl.

5. The process of claim 4 wherein the polycarbonate membrane is an asymmetric or POWADIR membrane.

6. The process of claim 5 wherein the polycarbonate membrane is in hollow fiber form.

7. The process of claim 6 wherein the polycarbonate membrane is fabricated from 2,2-bis(3,5-dibromo-4-hydroxyphenyl)propane.

8. The process of claim 7 wherein the residual solvent and non-solvent in the membrane is less than about 0.5 weight percent.

9. The process of claim 8 wherein the water is at a temperature of from about 0° to 100° C.

10. The process of claim 9 wherein the heat treatment temperature is from about 20° to 150° C.

11. The process of claim 10 wherein the polycarbonate membrane is first stored in water under ambient conditions of temperature and pressure for at least 1 day.

12. The process of claim 11 wherein the polycarbonate membrane possesses a separation factor for oxygen/nitrogen of at least about 4.

13. The process of claim 12 wherein the polycarbonate membrane possesses an oxygen gas flux of at least about $$3.0 \times 10^{-6} \frac{cm^3 \text{ (STP)}}{cm^2 \text{ s cm Hg}}.$$

14. The process of claim 13 wherein the polycarbonate membrane possesses an oxygen flux of at least about 1.0 Barrers.

15. The process of claim 11 wherein the polycarbonate membrane is stored in an amount of bleach sufficient to prevent bacterial growth on the membrane without adversely affecting membrane separation properties.

* * * * *

UNITED STATES PATENT AND TRADEMARK OFFICE
CERTIFICATE OF CORRECTION

PATENT NO. : 4,900,334
DATED : February 13, 1990
INVENTOR(S) : Wudneh Admassu; John A. Jensvold; Daniel O. Clark It is certified that error appears in the above-identified patent and that said Letters Patent is hereby corrected as shown below:

On coversheet, left-hand column, in "Inventors", "Clark" has been misspelled;

Col. 8, TABLE I, line 67, delete ".059" and insert -- 0.59 --;

Col. 10, TABLE II, line 30, after "Flushed" insert the footnote -- 1 --;

Col. 14, lines 25-34, change formula as follows:

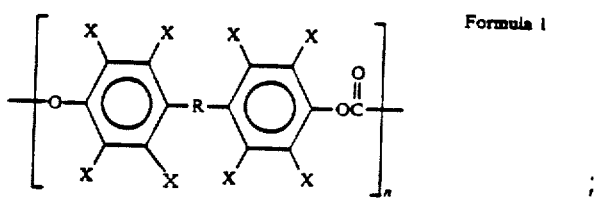

Formula I

Col. 15, lines 4-7, delete "$3.0 \times 10^{-6} \frac{cm^3(STP)}{cm^2 \, s \, cm \, Hg}$" and insert -- $3.0 \times 10^{-6} \frac{cm^3(STP)}{cm^2 \, sec \, cm \, Hg}$ --.

Signed and Sealed this

Twenty-ninth Day of October, 1991

Attest:

HARRY F. MANBECK, JR.

*Attesting Officer*      *Commissioner of Patents and Trademarks*